2,802,854
Patented Aug. 13, 1957

2,802,854

METHOD OF PREPARING PHOSPHORIC ACID ESTERS OF DIETHYLSTILBESTROL

Herbert Arnold, Bielefeld, Germany, assignor to Asta-Werke A. G. Chemische Fabrik, Brackwede, Westphalia, Germany No Drawing. Application April 6, 1953,
Serial No. 347,179

Claims priority, application Germany April 7, 1952

8 Claims. (Cl. 260—461)

This invention relates to new stilbestrol derivatives and to the preparation thereof.

It is known to convert phenols into their phosphoric acid esters by heating the same with phosphorus oxychloride. However, I could not obtain satisfactory results in my attempts to prepare in this manner from diethylstilbestrol (I) the mono (II) and di-phosphoric acid ester (III) by reaction with the calculated amounts of phosphorus oxychloride.

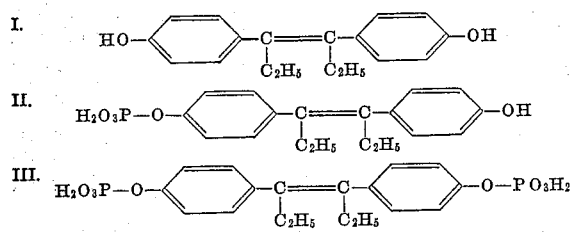

Only undefinable resins were produced, from which uniform compounds could not be isolated.

It is a principal object of the invention to provide an improved method for the preparation of phosphoric acid esters of diethylstilbestrol.

It is another object of the invention to provide pure therapeutically useful sodium salts of said esters.

I have found that it is possible to convert diethylstilbestrol (I) readily into the mono- or di- phosphoric acid ester of diethylstilbestrol (II) or (III), respectively, by heating (I) with phosphorus oxycloride, preferably at the boiling temperature of the latter, in the presence of a base capable of combining with the developed hydrogen chloride to form a salt which is readily removed. Suitable bases are, for instance, cyclic bases such as pyridine, piperidine, morpholine and the like; but also aliphatic bases such as diethylamine can be employed. The base must be used in an amount sufficient to bind the hydrogen chloride generated by the reaction, but it is advisable to avoid a substantial excess thereof.

For the preparation of diethylstilbestrol monophosphate, one mol of diethylstilbestrol is reacted with one mol of phosphorus oxychloride. For the preparation of the diphosphate, however, it is of advantage to employ an excess, preferably a large excess of phosphorus oxychloride over the theoretical amount.

If the conditions of reaction defined hereinbefore are maintained, the total amount of the employed base, e. g. pyridine, is bound by the hydrogen chloride developed during the esterification. The isolation of the formed pure phosphoric acid ester can readily be brought about, for instance, by decomposing the reaction mixture by the addition of ice, by separating out the formed solid product, and by treating said solid product with dilute caustic alkali, for instance sodium or potassium hydroxide with which the product is preferably ground to a powder. Subsequently, the mass is filtered and the filtrate is acidified with a strong inorganic acid, for instance 2 N hydrochloric or sulfuric acid, and shaken out with ether. The formed phosphoric acid ester separates out in the form of an oily ether adduct which is insoluble in the aqueous acid as well as in the etheric phase. After separation, the oil can be converted by heating in vacuo into a solid, readily pulverizable mass. The thus obtained powdery product is the desired phosphoric acid ester in analytically pure form.

In the preparation of the diphosphoric acid ester with application of a large excess of phosphorus oxychloride, said excess is, after termination of the reaction, removed in vacuo, and the remaining reaction product is processed in the manner set forth hereinabove. By treating the residue with ice and water, a colorless amorphous powder is obtained which for purification is dissolved in dilute sodium hydroxide with gentle heating. An excess of 2 N hydrochloric acid is added to the solution, which is then shaken with ether in a shaking funnel. After the mixture has been allowed to stand for a short time, an oil layer separates out which is neither soluble in the aqueous phase nor in the etheric phase. When the separated oil layer is heated under reduced pressure, the ether is distilled off and the oil is converted to a readily pulverizable mass, which is analytically pure diethylstilbestrol diphosphoric acid ester (III).

The very pure phosphoric acid esters obtained according to the invention can readily be converted into water soluble salts, for instance into the corresponding mono- and disodium salts, respectively. A suitable method consists in dissolving the obtained phosphoric acid ester in the theoretical amount of sodium hydroxide and in adding to said solution under stirring an excess of an organic solvent precipitating the sodium salt. Acetone is particularly suitable for this purpose. One addition of acetone, the sodium salt is precipitated as a colorless mass, which, on rubbing with acetone, is converted to a powder.

It has already been proposed to prepare primary phosphoric acid esters of diethylstilbestrol by reacting phosphorus-hydroxy chloride with diethylstilbestrol in the presence of a large excess of pyridine, where the reaction is carried out first under cooling with ice and subsequently at room temperature. According to that method, 1 part of diethylstilbestrol is employed for 2 parts of phosphorus hydroxy chloride and 10 parts of pyridine. In attempts to duplicate this method, which is described in the German Patent No. 720,468, it was found that instead of the expected diphosphoric acid ester its dipyridine salt was produced; it was impossible to obtain from this pyridine salt the free ester, neither by treatment with free inorganic acid nor by recrystallization.

The following examples are given to illustrate the invention. All parts are given by weight, unless specified otherwise.

Example 1

2.88 parts of phosphorus oxychloride were added, under cooling with ice, to a mixture consisting of 5 parts of diethyl stilbestrol (I) and 1.5 parts of pyridine. Subsequently, the mixture was heated for about 3½ hours in a metal bath at 120 to 130° C., and then ice was added thereto. The precipitated colorless solid product was separated and ground with 2 N sodium hydroxide, and the mixture was filtered. The aykaline filtrate was acidified in a separating funnel with a 2 N HCl solution and then thoroughly shaken with ether. An oil was formed, which was insoluble in the aqueous acid phase and in the etheric phase and separated out as an intermediate layer, which layer could be separated by simple draining. On heating in vacuo, the separated oil was converted into a solid readily pulverizable mass. The thus obtained monophosphoric acid ester was analytically pure (M. P. 167–170° C.), and needed no further purification.

In order to convert the monophosphoric acid ester (II) into the corresponding sodium salt, 18.7 g. of the mono-ester were dissolved in 30 cc. of absolute ethanol; the solution was filtered over charcoal and concentrated in vacuo to 100 cc. 1.2 g. of sodium dissolved in 80 cc. of absolute ethanol were added to said solution at 50° C. under stirring. The obtained precipitate was separated from the solvent, taken up in absolute ethanol and heated to 70° C. The hot suspension was filtered by applying suction, and the sodium salt remaining on the filter was rinsed with acetone.

*Example 2*

For the preparation of diethylstilbestrol diphosphoric acid ester (III), 94 parts of phosphorus oxychloride were added to 10 parts of diethylstilbestrol (I) and 7 parts of pyridine under cooling with ice, and the mixture was then heated for 3½ hours in a metal bath at 120 to 130° C. After vaporization of the excess of phosphorus oxychloride under reduced pressure, the residue was processed as described in Example 1. The obtained diphosphoric acid ester was a colorless powder (M. P. 204 to 206° C. under decomposition).

In order to convert the diphosphoric acid ester into the disodium salt, 2.26 g. of the ester were dissolved in 52.5 cc. of a 0.2 N sodium hydroxide solution with gentle heating. The solution was filtered and an excess of acetone was added to the filtrate. The disodium salt of III precipitated as a colorless mass, which could be pulverized by grinding it with acetone. The produce was analytically pure; it started softening at 190° C. and formed a uniform melt at 230° C. The aqueous solution had a pH of 6.5.

If it is desired to prepare the disodium salt of III in particularly pure form, 42.8 g. of diethylstilbestrol diphosporic acid ester are dissolved in 250 cc. of absolute ethyl alcohol and filtered over animal charcoal. Subsequently, the filtrate is combined, as described in Example 1 under stirring with a solution of 4.6 g. (2 atom equivalents) of metallic sodium in 150 cc. of absolute ethanol. The precipitated disodium salt is filtered under suction, rinsed with acetone and dried under reduced pressure. It is a colorless powder which dissolves in water to a solution having a pH of 4.85 to 5.00.

It is, of course, also possible to prepare mixtures of the monophosphoric acid ester (II) and the diphosphoric acid ester (III).

My novel preparation method of the phosphoric esters of diethylstilbestrol has the advantage of producing the esters directly in the pure state in the form of an easily pulverizable mass. The purity of the esters allows of precipitating the sodium salts directly in pure form from their solution by means of acetone, whereby water-soluble impurities are automatically removed.

What I claim is.

1. A method of preparing phosphoric acid esters of diethylstilbestrol comprising reacting phosphorus oxychloride with diethylstilbestrol in the presence of organic nitrogen bases in an amount just sufficient to combine with the total hydrogen chloride developed during the reaction, heating the reaction mixture at the boiling point of the phosphorus oxychloride, converting the thus obtained ester into its ether adduct, and recovering the pure ester from said adduct.

2. A method as defined in claim 1 for the preparation of the mono phosphoric acid ester of diethylstilbestrol, wherein phosphorus oxychloride and diethylstilbestrol are employed in substantially equimolar amounts.

3. A method as defined in claim 1 for the preparation of the di phosphoric acid ester of diethylstilbestrol, wherein more than two moles of phosphorus oxychloride are added for each mol of diethylstilbestrol.

4. A method of preparing phosphoric acid esters of diethylstilbestrol comprising reacting phosphorus oxychloride with diethylstilbestrol in the presence of pyridine in an amount just sufficient to combine with the total hydrogen chloride developed during the reaction, heating the reaction mixture at the boiling point of the phosphorus oxychloride, adding ice to the reaction mixture, removing the obtained solid product, treating said solid product with dilute caustic soda, filtering, acidifying the filtrate with a strong mineral acid, shaking with ether, separating out the obtained oil which is insoluble in the acid-aqueous and in the etheric phase, and heating said oil under reduced pressure so as to convert the same into a solid readily pulverizable mass.

5. A method as defined in claim 4, wherein the mineral acid is hydrochloric acid.

6. A method of preparing phosphoric acid esters of diethylstilbestrol comprising reacting phosphorus oxychloride with diethylstilbestrol in the presence of pyridine in an amount just sufficient to combine with the total hydrogen chloride developed during the reaction, heating the reaction mixture to the boiling point of the phosphorus oxychloride, separating the formed phosphoric acid ester, dissolving said ester in the calculated amount of caustic soda, and adding acetone so as to precipitate said sodium salt of the diethylstilbestrol phosphoric acid ester.

7. A method of preparing phosphoric acid esters of diethylstilbestrol comprising reacting phosphorus oxychloride with diethylstilbestrol in the presence of pyridine in an amount just suffcient to combine with the total hydrogen chloride developed during the reaction, heating the reaction mixture to the boiling point of the phosphorus oxychloride, separating the formed phosphoric acid ester, reacting said ester with substantially the theoretical amount of sodium dissolved in absolute ethanol, removing the formed sodium salt, heating said salt with ethanol, and separating said salt while still hot from the liquid phase.

8. A method as defined in claim 7 including the step of rinsing the separated sodium salt of the diethylstilbestrol phosphoric acid ester with acetone.

References Cited in the file of this patent
UNITED STATES PATENTS

| 2,234,311 | Miescher et al. | Mar. 11, 1941 |
| 2,395,934 | Miescher et al. | Mar. 5, 1946 |
| 2,634,265 | Toy | June 23, 1953 |